United States Patent [19]

Knuesting

[11] 4,062,174
[45] Dec. 13, 1967

[54] HAY-MAKING MACHINE
[75] Inventor: Gregor Knuesting, Lengede, Germany
[73] Assignee: Wilhelm Stoll, Maschinenfabrik GmbH, Lengede, Germany
[21] Appl. No.: 688,258
[22] Filed: May 20, 1976
[30] Foreign Application Priority Data
May 26, 1975 Germany .............................. 2523265
[51] Int. Cl.$^2$ ............................................ A01D 79/06
[52] U.S. Cl. ..................................................... 56/370
[58] Field of Search ......................... 56/370, 400, 365
[56] References Cited
FOREIGN PATENT DOCUMENTS
1,804,680  9/1970  Germany ................................ 56/370
1,228,808  4/1971  United Kingdom .................... 56/370

Primary Examiner—Jay N. Eskovitz
Attorney, Agent, or Firm—Blanchard, Flynn, Thiel, Boutell & Tanis

[57] ABSTRACT

A hay-making machine having rakes supported on a frame for rotation about a generally vertical axis. The tines of the rotary rake are secured on tine carrier arms which extend outwardly from an axis of rotation for the rotary rake and are rotatable with the tine carrier arm about the longitudinal axis therefor. A control lever is mounted on the inner end of the tine carrier arms. A cam roller is mounted on the control lever and engages a cam pathway mounted on the frame of the machine. The tines on the tine carrier arm are secured to a tine carrier part which is pivotal relative to the tine carrier arm about an axis perpendicular to the longitudinal axis of the tine carrier arm. The pivoting action of the tine carrier part facilitates a reversal of the tines to further facilitate a movement of the rotary rake in an opposite direction of rotation about the generally vertical axis of rotation. A locking mechanism is provided to secure the tine carrier part in two positions spaced approximately 180° from one another.

5 Claims, 3 Drawing Figures

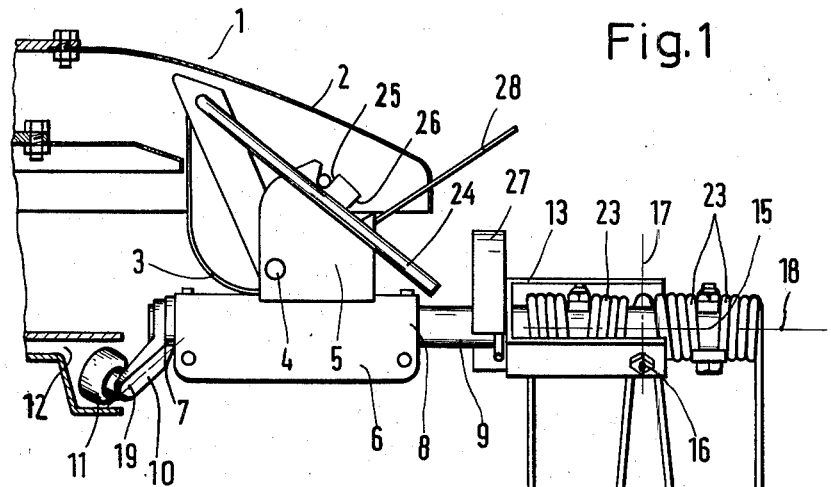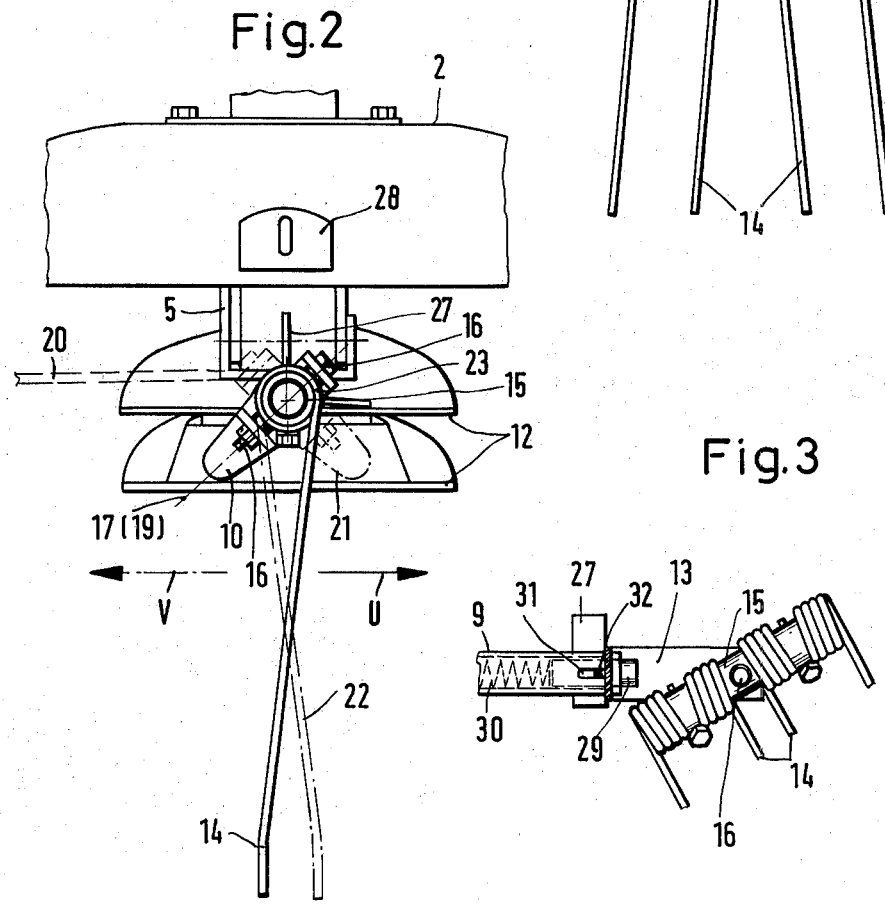

HAY-MAKING MACHINE

FIELD OF THE INVENTION

The invention relates to an improvement in a hay-making machine, such as U.S. Pat. No. 3,910,019, having at least one rotary rake which is driven rotatingly about a generally vertical axis of rotation and is supported in the frame of the machine, the tines of which rotary rake are secured on tine carrier arms which are directed outwardly from the axis of rotation of the rotary rake and are supported in a rotary frame pivotally about their longitudinal axis, which tine carrier arms have at their inner ends control levers which are provided with cam rollers, which control levers, for the purpose of the reversal of the direction of rotation of the rotary rakes, can be moved into mirror-image positions relative to a plane which is placed through the longitudinal axis of the tine carrier arms and the tines and can be coupled in one or another of these two positions with a control cam pathway.

BACKGROUND OF THE INVENTION

Such hay-making machines are, for example, known from German Pat. No. 1,299,159. The reversal of the direction of rotation of the rotary rakes known for this patent is needed in order to be able to carry out with this hay-making machine a larger number of different operations. For such reversal of the direction of rotation, a resetting of the control levers which are secured at the inner ends of the control levers which are secured at the inner ends of the tine carrier arms is then necessary so that they assume, for the respectively chosen direction of rotation of the rotary rake, a trailing position which then causes during rotation of the rotary rake the pivoting of the tines to take place in the necessary direction.

Certain disadvantages still exist in this conventional device in that a complicated and time-consuming adjustment is required for effecting the reversal of the machine from one into the other direction of rotation. A further disadvantage must also be seen in that for the two possible directions of rotation of the rotary rake, there must be provided on the tine carrier arms separate tines for these two different directions of rotation. Thus, the known device requires also a considerable expense in assembly.

The device according to German Pat. No. 1,913,196 does provide an improvement in handling of the reversing device, however, also in this known device separate tines for the two different directions of rotation of the rotary rake are necessary.

The object of the invention is to avoid the aforementioned disadvantages and to provide a hay-making machine which assures at a simple construction and with few parts, a simple adjustment procedure, however, is also able to carry out the same operations as the known machines.

This objective is achieved inventively by the tines of each tine carrier arm being secured on a tine carrier part which, viewed in a direction perpendicular to the longitudinal axis of the tine carrier arm, can be provided 180° about an axis perpendicular to the carrier arm axis and which is approximately aligned with a connecting line which crosses the longitudinal axis of the tine carrier arm and the axis of the associated cam roller and can be secured by means of a locking device in its two end positions, in which the tine lie then approximately mirror-imagelike to a plane which is placed through the longitudinal axis of the tine carrier arm and through the connecting line between the tine carrier arm and the axis of the cam roller.

The inventive arrangement of the tines on a tine carrier part and its pivotability about the aforementioned axis relative to the tine carrier arm permits, with only a few adjustments, the changing of the tines with respect to the control lever, which changing is necessary for the reversal of the direction of rotation of the rotary rake, and furthermore it is achieved through this inventive pivoting of the tines together with the tine carrier part, that the same tines assume the correct position for both directions of rotation of the rotary rake and thus can be used also for both directions of rotation. The adjusting of the control lever with respect to the control cam pathway, which adjustment is necessary furthermore for the reversal of the direction of rotation of the rotary rake, can be done by a conventional pivoting device, in which the tine carrier arm is pivoted relative to the rotary frame of the rotary rake and whereby then the cam roller, which exists on the control levers, disengages briefly from the cam pathway and engages the pathway again but in a position for permitting an operation in the other direction of rotation.

In a further development of the invention, it is provided that for locking the tine carrier part in its end positions, a locking bolt is provided which can be moved against the force of a spring in direction of the longitudinal axis of the tine carrier arm. This locking device permits in a simple manner a securing of the tine carrier part against the pivoting. In place of the locking bolt, it is, of course, also possible to use other locking devices.

The invention is illustrated in form on one exemplary embodiment in the drawing and will be described more in detail hereinafter.

BRIEF DESCRIPTION OF THE DRAWING

In the drawing:

FIG. 1 is a partial side view of a rotary rake of a hay-making machine, in which the tines are secured on a swingable tine carrier part;

FIG. 2 illustrates the device according to FIG. 1 seen in direction of the longitudinal axis of the tine carrier arm; and FIG. 3 is a partial view according to FIGS. 1 and 2 of a locking device for the swingable tine carrier part.

DETAILED DESCRIPTION

As can be seen from the partial side view of FIG. 1, the totality of the rotary rakes 1 of the hay-making machine is not illustrated in detail. Each rotary rake 1 has a rotary frame hood 2 which has a plurality of holders 3 (only one being illustrated in the drawing) secured to the underside thereof for supporting a bearing member 4. Bearing plates 5 are pivotally supported for movement about the axis of the bearing member 4. A cup-shaped support bearing housing 6 is secured to the bearing plates 5 and receives pivot bearings 7 and 8 therein to rotatably support the tine carrier arm 9. The tine carrier arm 9 has a control lever 10 mounted on the radially inner end thereof which faces the axis of rotation of the rotary rake 1, which axis of rotation is not illustrated in the drawing. A cam roller 11 is rotatably mounted at the free end of the control lever 10 and engages a control cam pathway 12 secured to a frame encircling the axis of rotation.

A support fork 13 is secured adjacent the outer end of the tine carrier arm 9. A tine carrier part 15 (FIGS. 2 and 3) having a plurality of tines 14 thereon is pivotally supported on the fork 13. The carrier part 15 is also securable in at least two positions. The tine carrier part 15 and the fork 13 have a bearing bolt 16 extending therethrough, the longitudinal axis 17 of which bearing bolt 16, viewed in direction of the longitudinal axis 18 of the tine carrier arm 9, coincides or is coplanar with the longitudinal axis 19 of the control lever 10. The relationship of the axis of the bearing bolt 16 on the tine carrier part 15 to the longitudinal axis 19 of the control lever 10 is illustrated in FIG. 2.

If a reversal in the direction of rotation of the rotary rake 1 is needed, the tines 14 are swung with their tine carrier part 15 from the position illustrated in full lines in FIG. 2, by pivoting the tine carrier part 15 180° about the axis of the bearing bolt 16, into the position indicated by broken lines 20. As a further measure to facilitate the reversal of the direction of rotation of the rotary rake 1 from the direction of rotation U to the direction of rotation V, the control lever 10 must be also swung from the position illustrated with full lines in FIG. 2 into the position indicated with dash-dotted lines 21. The tines then assume the position indicated with dash-dotted lines 22. By pivoting the tines 14 together with their tine carrier part 15, the tines 14 and the carrier part 15 become loaded both for the direction of rotation U and also for the direction of rotation V during the raking operation, each in the direction necessary for loading their spring coils 23.

The control lever 10 can thereby be swung relative to the control cam pathway 12 after the control cam pathway 12 and the cam roller 11 have been disengaged. The disengaging function is accomplished in the illustrated exemplary embodiment by an upward pivoting of the tine carrier arm 9 about the axis of the bearing 4, which axis extends transversely to the longitudinal axis 18 of the carrier arm 9. A locking lever 24 is pivotally supported on the rotary frame hood 2 and must be swung out of a locking groove 25 provided in the bearing plate 5. The locking lever 24 and the locking groove 25 are then moved into engagement again after the pivoting operation.

A second locking groove 26 is provided in the bearing plate 5 for the raised position of the tine carrier arm 9. The second locking groove 26 cooperates with the locking lever 24 to hold the carrier arm 9 in the raised position. A locking plate 27 which is secured to the tine carrier arm 9 is moved, when the carrier arm 9 is raised, into engagement with a plate 28 secured to the rotary frame hood 2. The tine carrier arm 9 and the tines 14 are then rigidly positioned with respect to the rotary frame hood and the rotary rake can be used as a tedder.

As is illustrated in FIG. 3, the swingable tine carrier part 15 can be secured in its two end positions (which are coaxial with the carrier arm 9) by means of a locking bolt 29 which is supported movably within the hollow interior of the tine carrier arm 9 against the force of a spring 30 and is positioned to be received inside the end of the hollow tine carrier part 15. This locking bolt 29 can be operated by a carrier pin 32 which is movable in a slotted hole 31 in the tine carrier arm 9 and secured to the locking bolt 29. Of course, other locking device for locking the tine carrier part 15 can also be used.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a hay-making machine having a machine frame and at least one rotary rake which is driven rotatingly about a generally vertical axis of rotation and is supported on said machine frame, a rotary frame mounted on said machine frame, said rotary rake having tines which are secured on each of a plurality rotatable tine carrier arms which extend outwardly from an axis of rotation of said rotary rake and which are supported in said rotary frame and are pivotal about their longitudinal axis, each of said tine carrier arms having at their radially inner ends elongated control levers which are provided with cam rollers, said control levers being movable into mirror-image positions relative to a plane which extends through the longitudinal axis of each of said tine carrier arms for the purpose of enabling a reversal of the direction of rotation of said rotary rakes, said cam rollers each being coupled in at least one of these two positions with a control cam pathway on said machine frame, the improvement comprising wherein each of said tine carrier arms has a tine carrier part which is pivotally secured to said carrier arm and is movable through at least 180° relative to said carrier arm, said tines of each tine carrier arm being secured to said tine carrier part and movable therewith about the pivot axis between said carrier arm and said carrier part, said pivot axis being generally aligned with the longitudinal axis of said control lever and intersects the longitudinal axis of said tine carrier arm and the axis of the associated cam roller, each of said tines extending at a right angle with respect to the longitudinal axis of said tine carrier arm, locking means for securing said tine carrier part in its two end positions so that the tines will lie approximately mirror-imagelike relative to a plane containing said longitudinal axis of said tine carrier arm and said longitudinal axis of said control lever whereby each of said tines is adjustable to accommodate a rotation of said rotary rake in opposite directions.

2. The improved device according to claim 1, wherein said locking means includes a locking bolt on said carrier arm and support means for supporting said locking bolt for reciprocal movement, a spring resisting movement of said locking bolt in direction of the longitudinal axis of the tine carrier arm.

3. The improved device according to claim 2, wherein said tine carrier part consists of a hollow tube member pivotal about said pivot axis located intermediate the ends thereof between positions wherein the ends thereof become aligned with said locking bolt said locking bolt being received in a selected one of the ends of said hollow tube member to fixedly lock the position thereof.

4. A hay-making machine having a machine frame and at least one reversible rotary rake driven for rotation about a generally vertical axis of rotation, comprising:

arm means rotatably mounted on said rotary rake and extending outwardly from the axis of rotation of said rotary rake;

elongated crank means for effecting a rotation of said arm means in response to a rotation of said rotary rake;

tine carrier means pivotally secured to said arm means adjacent the outer end thereof and movable through 180° relative to said arm means about the pivot axis between said arm means and said tine carrier means;

a plurality of tines mounted on said tine carrier means on one side of a plane defined by said axis of rotation of said arm means and the longitudinal axis of said crank means and being oriented in a first ground engaging position, said pivot axis being contained in said plane whereby a pivoting of said tine carrier means through 180° relative to said arm means will effect the relocation of said tines on the opposite side of said plane and in mirror-image relation to the pivot axis; and shifting means for effecting a shifting of said crank means to cause a relocation of said arm means and said tines in a second ground engaging position adapted for rotation of said rotary rake in an opposite direction of rotation.

5. The hay-making machine according to claim 4, wherein each of said tines are inclined toward the direction of rotation of said rotary rake from the ground engaging end thereof toward the place of attachment to said tine carrier means; and wherein said shifting means effects a relocation of said tines so that they too are inclined as aforesaid in the opposite direction of rotation.

* * * * *